(12) United States Patent
Hung

(10) Patent No.: US 7,382,561 B1
(45) Date of Patent: Jun. 3, 2008

(54) MEASURING AND CORRECTING ASYMMETRY IN MAGNETIC RECORDING DEVICES

(75) Inventor: William C. Hung, Irvine, CA (US)

(73) Assignee: Certance LLC, Costa Mesa, CA (US)

( * ) Notice: Subject to any disclaimer, the term of this patent is extended or adjusted under 35 U.S.C. 154(b) by 302 days.

(21) Appl. No.: 11/173,780

(22) Filed: Jun. 30, 2005

(51) Int. Cl.
*G11B 5/09* (2006.01)
(52) U.S. Cl. ....................................... 360/46
(58) Field of Classification Search ............ None
See application file for complete search history.

(56) References Cited

U.S. PATENT DOCUMENTS

| | | | | |
|---|---|---|---|---|
| 5,801,896 | A * | 9/1998 | Freitas | 360/77.08 |
| 6,043,943 | A | 3/2000 | Rezzi et al. | 360/46 |
| 6,147,828 | A | 11/2000 | Bloodworth et al. | |
| 6,324,144 | B1 | 11/2001 | Won et al. | 369/59.15 |
| 6,426,926 | B1 | 7/2002 | Sonu | 369/47.17 |
| 6,449,110 | B1 | 9/2002 | DeGroat et al. | |
| 6,525,891 | B1 * | 2/2003 | Tsunoda | 360/25 |
| 2005/0225889 | A1 * | 10/2005 | Brittenham et al. | 360/46 |

FOREIGN PATENT DOCUMENTS

| | | |
|---|---|---|
| EP | 0 766 244 A2 | 4/1997 |
| JP | 2002-334403 | 11/2002 |
| WO | WO 00/63889 | 10/2000 |

OTHER PUBLICATIONS

European Search Report dated Nov. 23, 2006, reference P7803.EPP, for Application No. 06253358.3.

* cited by examiner

*Primary Examiner*—Andrea Wellington
*Assistant Examiner*—Dan I Davidson
(74) *Attorney, Agent, or Firm*—Mark James Spolyar

(57) ABSTRACT

An asymmetry compensator for measuring and correcting of asymmetry in magnetic recording devices. The magnetic recording device includes a read head, an asymmetry compensator, a data decoder, and an analog-to-digital converter. The read head produces a read data signal that contains potential errors due to asymmetry. The read data signal is processed into a compensated data signal by the asymmetry compensator. The asymmetry compensator includes a power of two squaring device, a gamma amplifier, and a summing junction connected in a feed forward manner. The gamma amplifier uses an approach involving, for a positive isolated pulse, the amplitude of the positive pulse and the undershoot and, for a negative isolated pulse, the amplitude of the negative pulse and the overshoot. The approach further involves probabilities and weights in a weighted average to account for any variations with frequency. The approach may be performed in either the analog or digital domain.

7 Claims, 2 Drawing Sheets

MEASURING AND CORRECTING ASYMMETRY IN MAGNETIC RECORDING DEVICES

FIELD OF THE INVENTION

The present invention relates generally to magnetic recording devices. More specifically, the present invention relates to the measuring and correcting of asymmetry in magnetic recording devices.

BACKGROUND OF THE INVENTION

In magnetic recording devices, magneto-resistive heads are commonly used for reading signals encoded on a recording media. The recording media may take a number of forms including a disk or a tape. The signals are often in digital format. The digital information is stored on the recording media as a sequence of magnetic flux changes. One flux direction is designated as a logic one and the other flux direction is designated as a logic zero. When the signal is being read back off of the recoding media by the magneto-resistive head, the read head generates a positive voltage pulse for one flux direction and a negative voltage pulse for the other flux direction. Unfortunately, the amplitude of the pulses may not be identical. This is known as asymmetry in the read head. The amount of asymmetry may vary from head to head. The asymmetry can result in unwanted read errors.

BRIEF SUMMARY OF THE INVENTION

An asymmetry compensator for measuring and correcting of asymmetry in magnetic recording devices is disclosed. The magnetic recording device includes a read head, an asymmetry compensator, a data decoder, and an analog-to-digital converter. The read head produces a read data signal that contains potential errors due to asymmetry. The read data signal is processed into a compensated data signal by the asymmetry compensator. The asymmetry compensator includes a power of two squaring device, a gamma amplifier, and a summing junction connected in a feed forward manner. The gamma amplifier uses an approach involving, for a positive isolated pulse, the amplitude of the positive pulse and the undershoot and, for a negative isolated pulse, the amplitude of the negative pulse and the overshoot. The approach further involves probabilities and weights in a weighted average to account for any variations with frequency. The approach may be performed in either the analog or digital domain.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention. In the drawings.

DETAILED DESCRIPTION OF THE INVENTION

Various exemplary embodiments of the present invention are described herein in the context of the measuring and correcting of asymmetry in magnetic recording devices. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
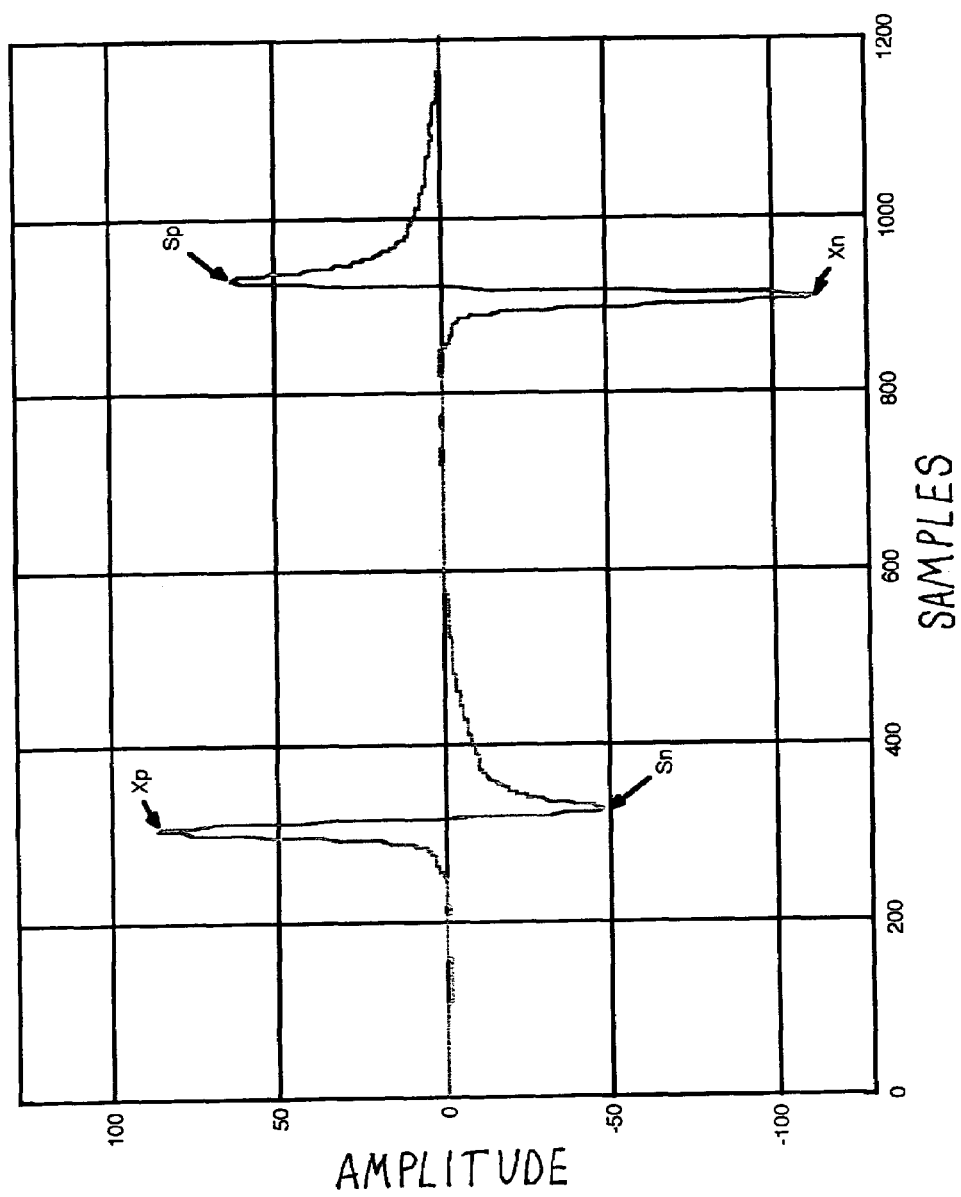
FIG. 1 is a graph of amplitude versus samples for two isolated read pulses.

Turning first to FIG. 1, a graph of amplitude versus samples for two isolated read pulses is shown. The graph is merely an example for discussion purposes. The actual values will depend on the circumstances. The sequence on the left between about samples 0 and 600 is for a positive pulse and the sequence on the right between about samples 600 and 1200 is for a negative pulse. For best results, the pulses are separated by sufficient time such that one pulse does not influence the other pulse. The amount of time will depend on the circumstances. It is not strictly necessary to isolate the pulses as shown. Theoretically, the ideal for a positive pulse would be for it to begin with an amplitude of zero, rise instantaneously to a positive amplitude, and return to an amplitude of zero. However, this ideal is nearly impossible to achieve in practice. Rather than the ideal, FIG. 1 demonstrates a more realistic case. As shown, the positive pulse actually exhibits a negative amplitude before returning to an amplitude of zero. This phenomenon is known as undershoot. Likewise, the negative pulse exhibits overshoot. The positive amplitude of the positive pulse is labeled $X_p$ and the amplitude of the undershoot is labeled $S_n$. Correspondingly, the negative amplitude of the negative pulse is labeled $X_n$ and the amplitude of the overshoot is labeled $S_p$. In the example shown, the magnitude of the negative pulse is greater than the magnitude of the positive pulse. This is a graphic instance of the asymmetry presented above. If the threshold levels are symmetrical, this read asymmetry may result in data errors. Further, the magnitude of the overshoot is greater than the magnitude of the undershoot. Recall that the pulses shown in FIG. 1 were selected to be far enough apart so as not to influence one another. This was for test or demonstration purposes. In real world data situations the pulses would most likely be much closer together, that is, they would have a greater frequency. As the frequency rises, the overshoot or undershoot of a first pulse can overlap with the next pulse or next several pulses depending on the circumstances. An undershoot will tend to pull down positive pulses and push down negative pulses. An overshoot will tend to do the opposite. Depending on the threshold levels, this may result in data errors. According to the present invention, a method and apparatus that compensates for the different magnitudes can be employed to reduce or eliminate data errors.

Figure 2:
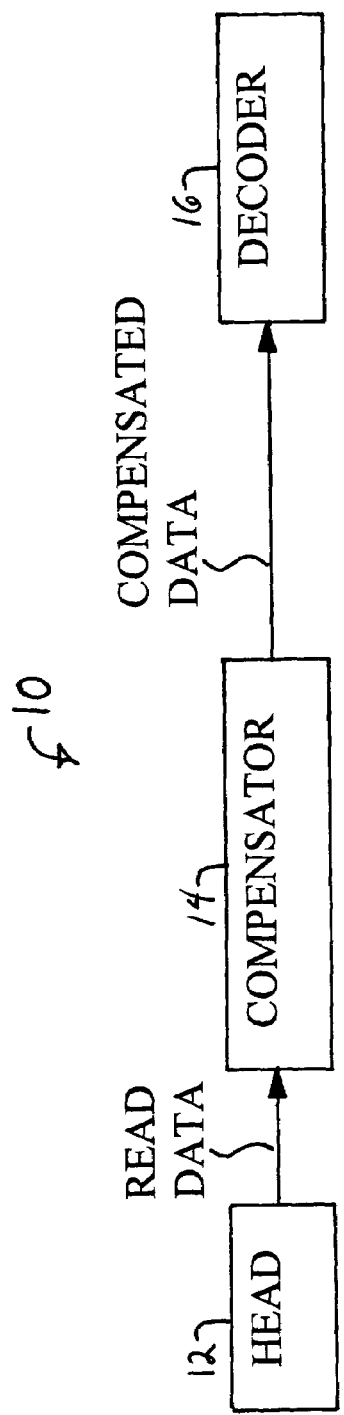
FIG. 2 is a block diagram of a magnetic recording device according to the present invention.

Turning now to FIG. 2, a block diagram of a magnetic recording device (device) 10 according to the present invention is shown. In the interest of clarity, only blocks that are pertinent to the discussion that follows are shown. Other blocks may be added as desired or required. The device 10 includes a magneto-resistive read head (head) 12, an asymmetry compensator (compensator) 14, and a data decoder (decoder) 16. The head 12 may be of conventional design and manufacture and is expected, as would be typical, to exhibit some form of asymmetry. Nevertheless, the device 10 will operate properly even if there is no asymmetry. The compensator 14 will be disclosed in more detail below. Rather than being a distinct block, the compensator 14 may be integrated into the head 12, the decoder 16, or both. The compensator 14 takes a read data signal as an input and produces a compensated data signal as an output. The read data signal will include any asymmetry produced by the head 12. The compensated data signal will include at least less of the asymmetry. The asymmetry need not be completely eliminated to achieve a significant reduction in data errors. The decoder 16 may also be of conventional design and manufacture. Generally, the decoder 16 reads the encoded digital data from the compensated data signal. Not shown in FIG. 2 is an Analog-to-Digital (A/D) converter that will be included in the device 10. The location of the A/D converter is a matter of design choice. The A/D converter may be integral to the head 12, the compensator 14, or the decoder 16. The A/D converter may also be a distinct block located either between the head 12 and the compensator 14 or between the compensator 14 and the decoder 16. Further, the A/D converter may be some combination of the above. The form of the signals and the operating behavior of the blocks will depend at least in part on the location chosen for the A/D converter.

Figure 3:
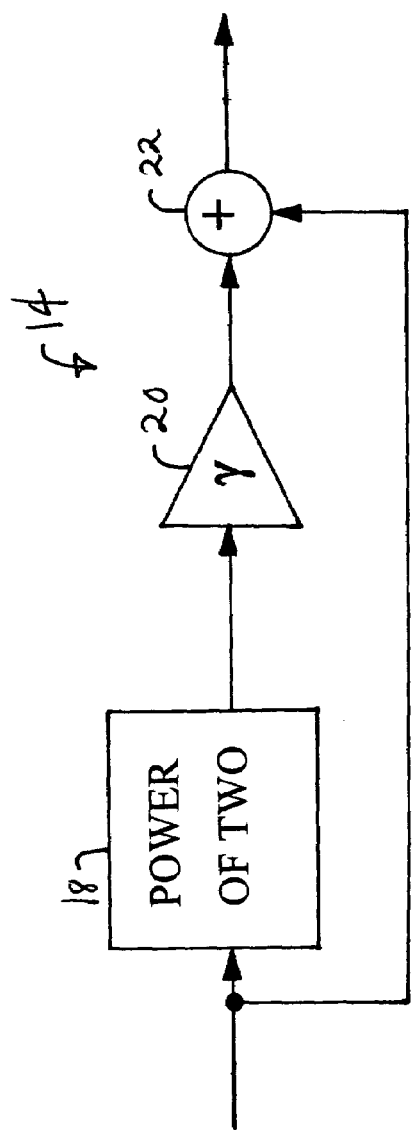
FIG. 3 is a functional block diagram according to the present invention of the asymmetry compensator of FIG. 2.

Turning now to FIG. 3, a functional block diagram according to the present invention of the asymmetry compensator 14 of FIG. 2 is shown. The compensator 14 includes a power of two squaring device (squaring device) 18, a gamma (γ) amplifier 20, and a summing junction 22 connected in a feed forward configuration as shown. The compensator 14 may operate in the analog domain or in the digital domain. The compensator may take many forms including an FPGA, a DSP, or an ASIC. In the discussion below, the term "gamma amplifier" will be used to refer to an amplifier that operates according to the following four equations. These equations are formulated to take into account both the disparity in the peaks as well as any potential impact of the undershoot and overshoot. According to the present invention, the optimal solution for the variable γ is as follows:

$$\gamma = -\frac{|X'_p| - |X'_n|}{(X'_p)^2 + (X'_n)^2} \qquad \text{EQ. 1}$$

For EQ. 1, the values of the variables $X_p'$ and $X_n'$ are calculated as follows:

$$X_p' = X_p + \overline{K}_p \cdot S_p \qquad \text{EQ. 2}$$

$$X_n' = X_n + \overline{K}_n \cdot S_n \qquad \text{EQ. 3}$$

For EQs. 2 and 3, the values of the variables $X_p$, $S_n$, $X_n$, and $S_p$ are those shown in FIG. 1. These values are likely to vary at least slightly from device to device, so it would be best, but not strictly necessary, to measure the values for each device individually. For EQ. 2, the variable $\overline{K}_p$ is an overshoot multiplier at all possible frequencies. For EQ. 3, the variable $\overline{K}_n$ is an undershoot multiplier at all possible frequencies. Recall that as the frequency rises, the overshoot or undershoot of a first pulse can overlap with the next pulse or next several pulses depending on the circumstances. For reference purposes, time is measured in bit cells of equal length. A pulse in a first bit cell may impact several bit cells that come later. The probability of there being an impact and the amount of the impact are encompassed by the $\overline{K}$ multiplier. In general, the $\overline{K}$ multiplier is calculated as a weighted average as follows:

$$\overline{K} = \sum_{i=1}^{M} P(i \cdot T) \cdot K(i \cdot T) \qquad \text{EQ. 4}$$

where the index i runs from 1 to M and the variable T is the width of one bit cell. The value of M depends on a number of factors including the width of the wave form. Another possible factor is a consequence of any run-length-limited code that may be in effect. The variable P is a probability and the variable K is a weight. Both variables depend on the number of bit cells. The EQ. 4 calculation is typically performed for both overshoot and undershoot. It may be the case however that one or the other is not significant and the $\overline{K}$ multiplier may be zero for one or the other but not both. If zero, then X' is equal to X in one of the two EQs. 2 or 3 above. The variables P and K may be empirically determined, mathematically derived, or some combination of both. If the frequency content of the data is highly concentrated in one particular frequency, then the impact of the overshoot or undershoot at that frequency should be weighted heavily by comparison to other frequencies. Through the above equations, the gamma amplifier 20 as part of the compensator 14 can reduce or eliminate the read data asymmetry in the magnetic recording device 10 of FIG. 2.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A magnetic recording device comprising:
   a read head for reading magnetic fluxes on a magnetic media, the read head having an output from which is transmitted a read data signal;
   an asymmetry compensator for at least reducing an affect of non-linear asymmetry in the read data signal, the asymmetry compensator having an input coupled to the output of the read head, the asymmetry compensator comprising a gamma amplifier whose compensation of the read data signal depends at least in part on an amplitude of a positive pulse in the read data signal and an amplitude of an undershoot relative to the positive pulse in the read data signal, and the asymmetry compensator having an output from which is transmitted a compensated data signal;
   a data decoder for reading encoded data from the compensated data signal, the data decoder having an input coupled to the output of the asymmetry compensator; and an analog-to-digital (A/D) converter for converting analog data to digital data;

wherein the compensation of the read data signal by the gamma amplifier further depends at least in part on an amplitude of a negative pulse in the read data signal and an amplitude of an overshoot relative to the negative pulse in the read data signal; and wherein the compensation of the read data signal by the gamma amplifier further depends at least in part on the width of a wave form in a pulse in the read data signal.

2. A magnetic recording device comprising:

a read head for reading magnetic fluxes on a magnetic media, the read head having an output from which is transmitted a read data signal;

an asymmetry compensator for at least reducing an affect of non-linear asymmetry in the read data signal, the asymmetry compensator having an input coupled to the output of the read head, the asymmetry compensator comprising a gamma amplifier whose compensation of the read data signal depends at least in part on an amplitude of a positive pulse in the read data signal and an amplitude of an undershoot relative to the positive pulse in the read data signal, and the asymmetry compensator having an output from which is transmitted a compensated data signal;

a data decoder for reading encoded data from the compensated data signal, the data decoder having an input coupled to the output of the asymmetry compensator;

an analog-to-digital (A/D) converter for converting analog data to digital data;

wherein the compensation of the read data signal by the gamma amplifier further depends at least in part on an amplitude of a negative pulse in the read data signal and an amplitude of an overshoot relative to the negative pulse in the read data signal; and wherein the asymmetry compensator further comprises:
  a power of two squaring device having an input and an output; and
  a summing junction having a first input, a second input, and an output, wherein the input of the power of two squaring device is coupled to the input of the asymmetry compensator and the second input of the summing junction, the output of the power of two squaring device is coupled to an input of the gamma amplifier, an output of the gamma amplifier is coupled to the first input of the summing junction, and the output of the summing junction is coupled to the output of the asymmetry compensator.

3. A method for at least reducing an affect of non-linear asymmetry in a read data signal of a magnetic recording device, the method comprising:

receiving a read data signal;

processing the read data signal into a compensated data signal in a non-linear asymmetry compensator of the magnetic recording device, the asymmetry compensator comprising a gamma amplifier whose compensation of the read data signal depends at least in part on an amplitude of a positive pulse in the read data signal and an amplitude of an undershoot relative to the positive pulse in the read data signal;

transmitting the compensated data signal;

wherein the compensation of the read data signal by the gamma amplifier further depends at least in part on an amplitude of a negative pulse in the read data signal and an amplitude of an overshoot relative to the negative pulse in the read data signal; and wherein the compensation of the read data signal by the gamma amplifier further depends at least in part on the width of a wave form in a pulse in the read data signal.

4. An apparatus for at least reducing an affect of non-linear asymmetry in a read data signal of a magnetic recording device, the apparatus comprising:

means for receiving a read data signal;

means for processing the read data signal into a compensated data signal in an non-linear asymmetry compensator of the magnetic recording device, the asymmetry compensator comprising a gamma amplifier whose compensation of the read data signal depends at least in part on an amplitude of a positive pulse in the read data signal and an amplitude of an undershoot relative to the positive pulse in the read data signal;

means for transmitting the compensated data signal;

wherein the compensation of the read data signal by the gamma amplifier further depends at least in part on an amplitude of a negative pulse in the read data signal and an amplitude of an overshoot relative to the negative pulse in the read data signal; and wherein the compensation of the read data signal by the gamma amplifier further depends at least in part on the width of a wave form in a pulse in the read data signal.

5. A magnetic recording device comprising:

a read head for reading magnetic fluxes on a magnetic media, the read head having an output from which is transmitted a read data signal;

an asymmetry compensator for at least reducing an affect of non-linear asymmetry in the read data signal, the asymmetry compensator having an input coupled to the output of the read head, the asymmetry compensator comprising a gamma amplifier whose compensation of the read data signal depends at least in part on an amplitude of a positive pulse in the read data signal and an amplitude of an undershoot relative to the positive pulse in the read data signal, and the asymmetry compensator having an output from which is transmitted a compensated data signal;

a data decoder for reading encoded data from the compensated data signal, the data decoder having an input coupled to the output of the asymmetry compensator; and an analog-to-digital (A/D) converter for converting analog data to digital data;

wherein the compensation of the read data signal by the gamma amplifier further depends at least in part on an amplitude of a negative pulse in the read data signal and an amplitude of an overshoot relative to the negative pulse in the read data signal; and wherein the compensation of the read data signal by the gamma amplifier depends at least in part on the following equations:

$$\gamma = -\frac{|X'_p| - |X'_n|}{(X'_p)^2 + (X'_n)^2},$$

where $\gamma$ is a variable representing the amount of compensation, $$X_p' = X_p + \overline{K}_p \cdot S_p$$

and $$X_n' = X_n + \overline{K}_n \cdot S_n, X_p$$

is the amplitude of a positive pulse in the read data signal, $S_p$ is the amplitude of an undershoot for the positive pulse, $\overline{K}_p$ is a multiplier for the positive pulse, $X_n$ is the amplitude of a negative pulse in the read data signal, $S_n$ is the amplitude of an overshoot for the negative pulse, and $\overline{K}_n$ is a multiplier for the negative pulse.

6. A method for at least reducing an affect of non-linear asymmetry in a read data signal of a magnetic recording device, the method comprising:

receiving a read data signal;

processing the read data signal into a compensated data signal in a non-linear asymmetry compensator of the magnetic recording device, the asymmetry compensator comprising a gamma amplifier whose compensation of the read data, signal depends at least in part on an amplitude of a positive pulse in the read data signal and an amplitude of an undershoot relative to the positive pulse in the read data signal;

transmitting the compensated data signal;

wherein the compensation of the read data signal by the gamma amplifier further depends at least in part on an amplitude of a negative pulse in the read data signal and an amplitude of an overshoot relative to the negative pulse in the read data signal; and wherein the compensation of the read data signal by the gamma amplifier depends at least in part on the following equations:

$$\gamma = -\frac{|X'_p| - |X'_n|}{(X'_p)^2 + (X'_n)^2},$$

where $\gamma$ is a variable representing the amount of compensation, $X_p' = X_p + \overline{K}_p \cdot S_p$ and $X_n' = X_n + \overline{K}_p \cdot S_n$, $X_p$ is the amplitude of a positive pulse in the read data signal, $S_p$ is the amplitude of an undershoot for the positive pulse, $\overline{K}_p$ is a multiplier for the positive pulse, $X_n$ is the amplitude of a negative pulse in the read data signal, $S_n$ is the amplitude of an overshoot for the negative pulse, and $\overline{K}_n$ is a multiplier for the negative pulse.

7. The An apparatus for at least reducing an affect of non-linear asymmetry in a read data signal of a magnetic recording device, the apparatus comprising:

means for receiving a read data signal;

means for processing the read data signal into a compensated data signal in an non-linear asymmetry compensator of the magnetic recording device, the asymmetry compensator comprising a gamma amplifier whose compensation of the read data signal depends at least in part on an amplitude of a positive pulse in the read data signal and an amplitude of an undershoot relative to the positive pulse in the read data signal;

means for transmitting the compensated data signal;

wherein the compensation of the read data signal by the gamma amplifier further depends at least in part on an amplitude of a negative pulse in the read data signal and an amplitude of an overshoot relative to the negative pulse in the read data signal; and wherein the compensation of the read data signal by the gamma amplifier depends at least in part on the following equations:

$$\gamma = -\frac{|X'_p| - |X'_n|}{(X'_p)^2 + (X'_n)^2},$$

where $\gamma$ is a variable representing the amount of compensation, $X_p' = X_p + \overline{K}_p \cdot S_p$ and $X_n' = X_n + \overline{K}_p \cdot S_n$, $X_p$ is the amplitude of a positive pulse in the read data signal, $S_p$ is the amplitude of an undershoot for the positive pulse, $\overline{K}_p$ is a multiplier for the positive pulse, $X_n$ is the amplitude of a negative pulse in the read data signal, $S_n$ is the amplitude of an overshoot for the negative pulse, and $\overline{K}_n$ is a multiplier for the negative pulse.

* * * * *